United States Patent
Rotem et al.

(10) Patent No.: US 9,268,378 B2
(45) Date of Patent: Feb. 23, 2016

(54) TECHNIQUES AND SYSTEM FOR MANAGING PLATFORM TEMPERATURE

(71) Applicant: Intel Corporation, Santa Clara, CA (US)

(72) Inventors: Efraim Rotem, Haifa (IL); Alon Naveh, Ramat Hasharon (IL); Doron Rajwan, Rishon Le-Zion (IL); Nadav Shulman, Tel Mond (IL); Eliezer Weissmann, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 295 days.

(21) Appl. No.: 13/931,128

(22) Filed: Jun. 28, 2013

(65) Prior Publication Data
US 2015/0006937 A1   Jan. 1, 2015

(51) Int. Cl.
*G06F 1/20* (2006.01)
*G06F 1/32* (2006.01)

(52) U.S. Cl.
CPC ............... *G06F 1/206* (2013.01); *G06F 1/203* (2013.01); *G06F 1/3206* (2013.01); *G06F 1/3215* (2013.01); *G06F 1/3243* (2013.01); *G06F 1/3287* (2013.01)

(58) Field of Classification Search
CPC ........ G06F 1/203; G06F 1/206; G06F 1/3243
See application file for complete search history.

(56) References Cited

U.S. PATENT DOCUMENTS

| | | | |
|---|---|---|---|
| 8,283,609 B2 | 10/2012 | Jeong | |
| 2006/0095798 A1 | 5/2006 | Finkelstein et al. | |
| 2011/0077794 A1* | 3/2011 | Ahuja et al. | 700/300 |
| 2011/0249371 A1 | 10/2011 | Jin et al. | |
| 2013/0044786 A1 | 2/2013 | Bhattacharya et al. | |
| 2013/0060399 A1 | 3/2013 | Ahuja et al. | |
| 2013/0090888 A1* | 4/2013 | Anderson et al. | 702/130 |
| 2013/0135782 A1 | 5/2013 | Roth et al. | |
| 2013/0311801 A1* | 11/2013 | Kong et al. | 713/320 |

OTHER PUBLICATIONS

International Search Report and Written Opinion received for PCT Patent Application No. PCT/US2014/043825, mailed Oct. 23, 2014, 11 pages.
Official letter and Search Report received for Taiwanese Patent Application No. 103119400, mailed Jun. 17, 2015, 7 pages.

* cited by examiner

*Primary Examiner* — Albert Wang
(74) *Attorney, Agent, or Firm* — Kacvinsky Daisak Bluni PLLC (57) ABSTRACT

In one embodiment an apparatus includes a temperature sensor to perform a multiplicity of junction temperature measurements for a component in a platform, a controller comprising logic at least a portion of which is in hardware. The logic may receive from the temperature sensor the multiplicity of junction temperature measurements and may instruct the component to perform a first power down action of the component when a junction temperature measurement exceeds a first threshold, and may instruct the component to perform a second power down action of the component when an average junction temperature based on the multiplicity of junction temperature measurements exceeds a second threshold. Other embodiments are disclosed and claimed.

27 Claims, 7 Drawing Sheets

TECHNIQUES AND SYSTEM FOR MANAGING PLATFORM TEMPERATURE

TECHNICAL FIELD

Embodiments described herein generally relate to power management in integrated circuit devices and in particular controlling platform temperature via monitoring of device junction temperature.

BACKGROUND

In present day computing and communications small form factor systems or platforms are enjoying increased popularity, including tablet devices, ultrabook computers, and other portable devices. Due in part to their small size, power in these systems (also referred to herein as "devices") may typically be limited by the so-called skin temperature or chassis skin temperature of the system, such as the housing surface of a tablet device. Accordingly, the temperature limit for operating a semiconductor chip such as a general processor (CPU) within a small form factor system, which is also referred to as the maximum "junction temperature," may not be a limiting factor during normal system operation. For example in typical portable devices in the ultrabook or tablet category, the maximum chassis skin temperature may be in the range of 40° C. or so while the maximum steady state junction temperature may be specified at 100° C.

A major benefit of some modern architectures that have large size of processor core components such as four or eight processor cores, is the ability to rapidly and on-demand boost processor and system performance. Such "turbo burst" capability allows a CPU and/or graphics processor unit (GPU) to burst to very high power for short periods of time, delivering a responsive system with enhanced user experience. Because the junction temperature time constants are much faster than those of the whole system the CPU/GPU junction temperature (also referred to herein generally as "$T_J$"), can in principle reach a $T_J$ of 100° C. without violating the system skin temperature limit, which may specify a much lower temperature, as noted. However, controlling the CPU junction temperature to its steady state may significantly degrade the benefit provided by so-called turbo operation. On the other hand, some schemes that may permit a relatively higher Tj for operating CPU or GPU components require skin temperature sensors, relays and other components. This, however, adds to manufacturing complexity by creating a need to design CPU specifications based upon external devices such as controllers.

Accordingly, there may be a need for improved techniques and apparatus to solve these and other problems.

DETAILED DESCRIPTION

Various embodiments are directed to managing platform power and in particular to managing component temperature to optimized platform performance. A platform may be a computing device, communications device, hybrid communications/computing device, a controller device, or other hardware. The platforms of the present embodiments include multiple electronic processing components such as graphics processor units (GPU) and general purpose processors, which may be referred to herein as "CPU." A general purpose processor may include one or more processor cores, or "CPU cores" and the terms "CPU" and "CPU core" may be used interchangeably herein unless otherwise noted. The multi-component platforms include various additional components, which may include, among others, cache local to the CPU, memory, system clocks, input/output (I/O) devices, display engines, memory controllers, I/O controller, digital signal processors, disk drives, radio frequency communications circuitry, digital camera devices or other sensor devices, communications interfaces including antennae, universal serial bus (USB) interfaces, and power control units (power management units). The embodiments are not limited in this context.

Consistent with the present embodiments, methods and apparatus are provided to control junction temperature in one or more components such as a CPU, GPU, memory device, chipset or other device. As used herein, the term "junction temperature ($T_J$)" refers to the on-chip (on-die) temperature for a component such as a CPU, and more particularly to the measured on-die temperature or a temperature value calculated from an on-die temperature measurement.

In the present embodiments, the junction temperature for a component may be measured at a single point or at multiple points on a semiconductor die. Techniques and apparatus are disclosed for controlling junction temperature of one or more components in a manner that limits an average junction temperature to a value that is consistent with maintaining the skin temperature of a platform that contains the components to within acceptable limits. Such components are also generally referred to herein as "device(s) under control." The present embodiments, by controlling average junction temperature, extend the ability for components to operate at higher temperature for longer durations, for example, operating at a maximum junction temperature specified for a CPU. The ability to extend high temperature operation for a given chip such as a CPU in turn increases the duration for operation of a chip under high performance conditions that generate high temperature excursions. Accordingly, the present embodiments provide better component performance that is consistent with maintaining platform skin temperature within specified limits. Moreover, by controlling junction temperature as a method to limit skin temperature, the present embodiments are more responsive to ambient changes which may change component temperature for a given operating power.

Figure 1:
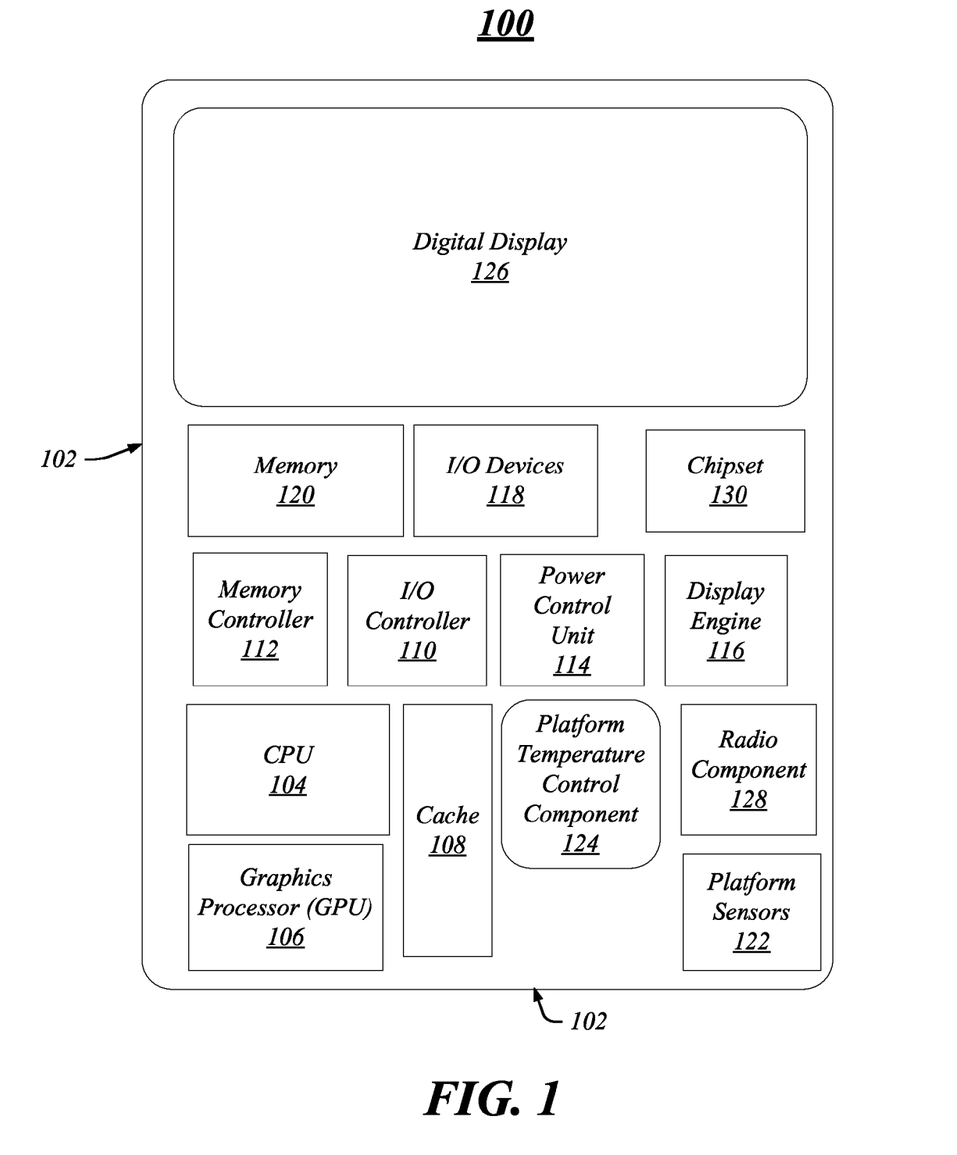
FIG. 1 illustrates a diagram for an exemplary system.

FIG. 1 illustrates a block diagram for a platform or system 100 consistent with the present embodiments. The system 100 may perform general computing and graphics processing functions, perform wireless communications, performing electronic imaging, and other functions. As illustrated, the system 100 includes a housing 102 that contains various additional components as shown. In various embodiments the system 100 may include CPU 104, GPU 106, cache 108, input/output (I/O) controller, 110, memory controller 112, power control unit 114, display engine 116, I/O devices 118, memory 120, platform sensors 122, platform temperature control component 124, digital display 126, radio component 128 and chipset 130. A radio component may be a wireless communications chip and chipset may be a chip in communication with a CPU and/or GPU to perform various known control functions and/or input/output functions.

During operation, one or more of the components housed in system 100 may generate sufficient heat to cause the temperature of housing 102, that is, the skin temperature of system 100, to approach or reach a skin temperature limit designed for the system 100. Such a skin temperature limit may be set to a value that does not cause excessive discomfort to a user of system 100 who may come into intermittent or continuous contact with the housing 102. Consistent with the present embodiments, the platform temperature control unit 124 may monitor and adjust operation of one or more components in system 100 based upon a respective junction temperature measurement. As detailed below, this is done in such a manner that a steady state temperature of the component in question does not exceed a value established to ensure that skin temperature limit of the system 100 is not exceeded.

The platform temperature control component 124 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In particular embodiments, the platform temperature control component 124 includes logic at least a portion of which is in hardware and is included in a controller or processor. For example the logic may be included in a processor circuit linked to other components of system 100. In one particular example the logic forms part of a processor such as a CPU 104 and is communicatively linked to the other components of system 100. In other embodiments, the logic of the platform temperature control component 124 may be located in a controller such as the power management or power control unit 114. In further embodiments, the platform temperature control component 124 may be distributed across multiple platform components including cache and/or memory components.

Figure 2:
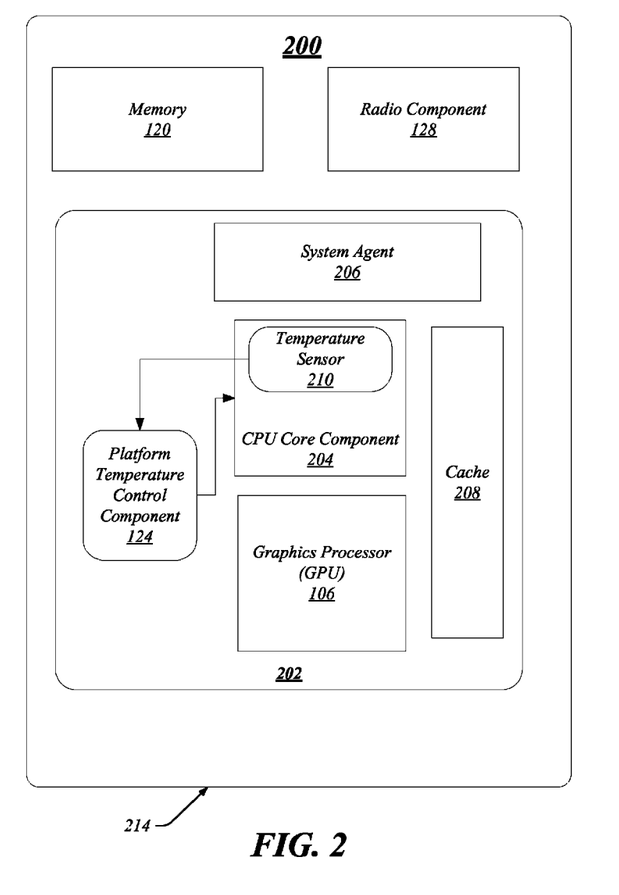
FIG. 2 illustrates another exemplary system.

FIG. 2 depicts an embodiment of a system 200 that includes a chip 202, memory 120 and radio component 128, which are located on separate chips. In this example, the chip 202 includes a CPU core component 204, which may include multiple processing cores that are not individually shown. The chip 202 also includes a GPU 106, system agent 206, and cache 208. The system agent 206 may perform various control and input/output functions including memory control, display control, and the like. In this embodiment a temperature sensor 210 is provided to measure temperature of CPU core component 204. The temperature sensor 210 may be a discrete sensor or may be integrated in circuitry within the CPU core component 204 in different implementations. The temperature sensor 210 may alternatively be located proximate the CPU core component 204 at other points on the die that constitutes the chip 202, such that temperature measurements recorded by the temperature sensor 210 provide junction temperature measurement with sufficient accuracy.

In the embodiment of FIG. 2, the platform temperature control component 124 is coupled to the temperature sensor 210 to monitor temperature readings produced by the temperature sensor 210 as needed. The platform temperature control component 124 further is operative to adjust power of the CPU core component 204 based upon temperature sensor data provided by the temperature sensor 210, details of which are provided below with respect to FIGS. 5 and 6. By monitoring junction temperature using the temperature sensor 210 the actual junction temperature may be recorded in real time. This allows an average junction temperature to be estimated or calculated in real time to determine when the average junction temperature is approaching a present limit based upon a skin temperature limit that specifies a temperature limit for surface 214.

Figure 3:
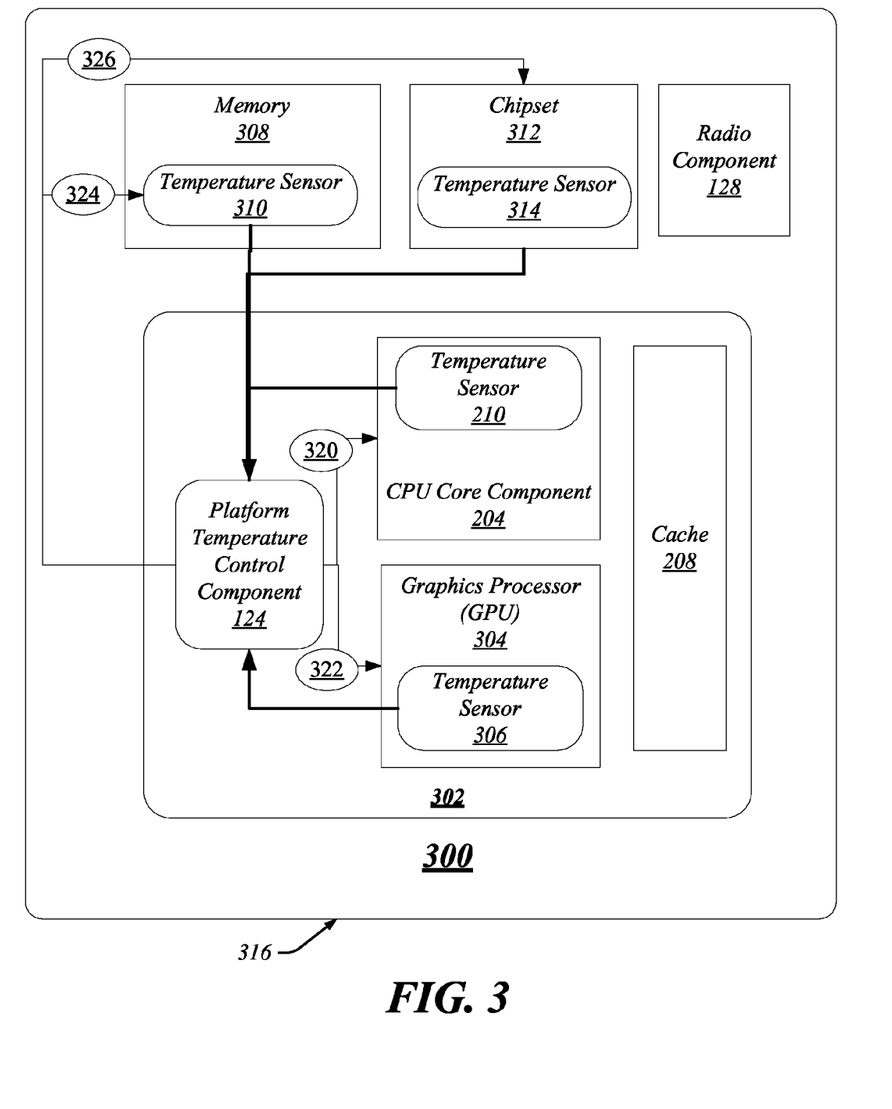
FIG. 3 illustrates a further exemplary system.

FIG. 3 depicts details of another embodiment of a system 300 that includes a chip 302 and memory 308 and chipset 312 that are located on separate chips. In FIG. 3 in addition to the CPU core component 204 described above with respect to FIG. 2, the chip 302 contains a graphics processor 304 that includes a temperature sensor 306 to measure temperature of the graphics processor 304. Even though the graphics processor 304 and CPU core component 204 are located together on the same chip 302, two different temperature sensors 210, 306 are provided to determine temperature more locally to each respective component, that is, CPU core component 204 and graphics processor 304.

In addition, in the embodiment of FIG. 3, the memory 308 includes its own temperature sensor 310, while the chipset has its own temperature sensor 314. As illustrated in FIG. 3, each of the temperature sensors 210, 306, 310, and 314 is communicatively coupled to the platform temperature control component 124. In this manner junction temperature for each of the CPU core component 204, graphics processor 304, memory 308, and chipset 312 may be monitored independently by the platform temperature control component 124. As further illustrated in FIG. 3, during operation of each or all of these components, the platform temperature control component 124 may send control signals to adjust component operation. For example, a message 320 may be sent to the CPU core component 204 to adjust core power based on junction temperature measurement recorded by temperature sensor 210, a message 323 may be sent to the GPU 304 to adjust GPU power based on junction temperature measurement recorded by temperature sensor 306. Similarly, a message 324 may be sent to the memory 308 to adjust memory operation based on junction temperature measurement recorded by temperature sensor 310, while a message 326 may be sent to the chipset 312 to adjust chipset operation based on junction temperature measurement recorded by temperature sensor 314. Together or separately, these adjustments allow performance of each component to be maximized consistent with maintaining skin temperature of housing 316 at or below a specified limit.

In detail, the platform temperature control component 124 may receive a single set of temperature sensor measurements or multiple temperature sensor measurements to track junction temperature in real time for one or more components or devices under control of a platform. These real time junction temperature measurements may additionally be used to generate a calculated average junction temperature as detailed below. The platform temperature control component 124 may then use the junction temperature and calculated average junction temperature values at any instance to determine whether to adjust operation of the given device under control. In particular, the platform temperature control component 124 may store, retrieve, or receive a set of limits including a junction temperature limit and a steady state junction temperature. As detailed in the FIGS. to follow, these limits may then be used to compare to junction temperature and/or average junction temperature of a device under control in real time to adjust operation of the device under control when the limits are breached.

Figure 4:
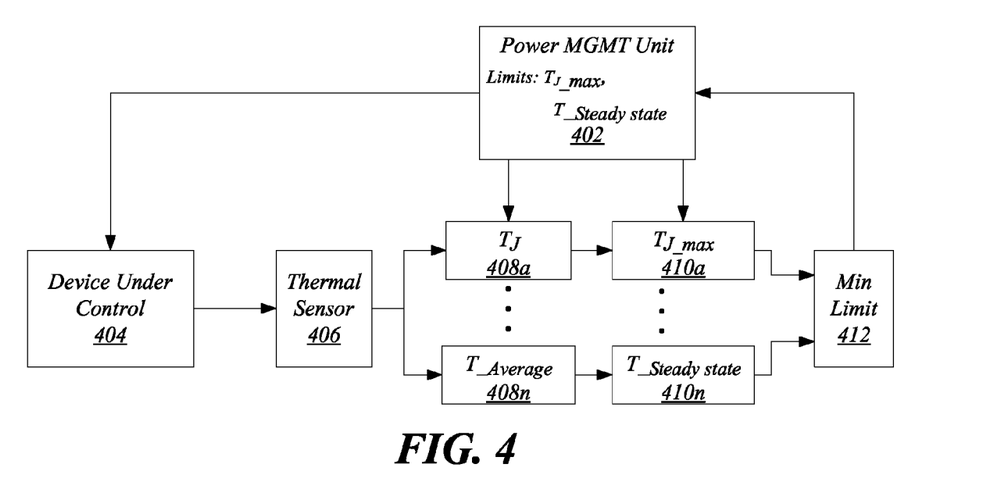
FIG. 4 illustrates a block diagram of platform temperature control.

FIG. 4 depicts an embodiment in which the platform temperature control component is included in a power management (control) unit 402. In particular, FIG. 4 illustrates a block diagram for temperature control of any given device using junction temperature measurements. In the illustration shown, the device under control 404 may be a CPU, GPU, memory, chipset, or other component. As illustrated in FIG. 4, the power management unit 402 retrieves or stores limits $T_{J\_MAX}$ and $T_{J\_STEADY\_STATE}$. The $T_{J\_MAX}$ limit refers to a maximum junction temperature for a given device under control 404, which may be set at a value to ensure safe operation of a device under control 404. In embodiments where device under control is a CPU, $T_{J\_MAX}$ may be set to values up to 100° C. or so in some examples. In some instances Tj_max may change dynamically due to system condition changes, such as, for example, when operating with a fan or without it. The change of the Tj_max may be controlled either by system software or system firmware in different examples.

The $T_J$ value may be a calculated temperature level derived from temperature measurements made at a given die, and reflects an instantaneous junction temperature value that should not exceed $T_{J\_MAX}$. On the other hand, the $T_{J\_AVERAGE}$ is a calculated temperature level that reflects a long term average junction temperature, which may change on a scale of seconds, and which should not cross a value designated as $T_{J\_STEADY\_STATE}$ to ensure that the skin temperature for a given platform not be exceeded. The $T_{J\_AVERAGE}$ limit not to be exceeded ($T_{J\_STEADY\_STATE}$) as well as the time constants used for the evaluation, may be determined based upon the size and architecture and cooling capability of the platform that contains the device under question. Accordingly, as detailed below with respect to FIGS. 5 and 6 $T_J$ may exceed $T_{J\_AVERAGE}$ for short durations.

As further shown in FIG. 4, the device under control 404 outputs heat to the thermal sensor 406 which records temperature values of the device under control. The temperature values are used to calculate the values $T_J$ 408a or $T_{J\_AVERAGE}$ 408n. If the limit $T_{J\_MAX}$ 410a or $T_{J\_STEADY\_STATE}$ 410n are exceeded the Min limit 412 is triggered which causes the power management unit 402 to send control signals to adjust operation of the device under control 404.

Figure 5:
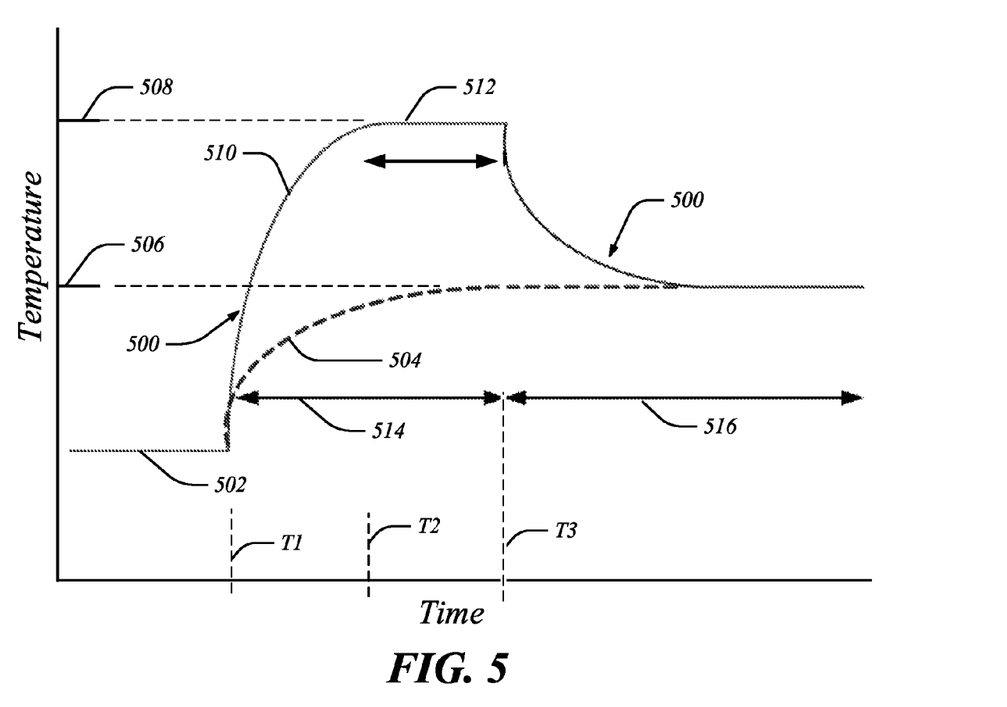
FIG. 5 illustrates an example of junction temperature behavior consistent with various embodiments.

FIG. 5 illustrates the control of temperature for a device under control in accordance with various embodiments. In the example of FIG. 5, the junction temperature of a device under control is monitored and the power to the device under control is adjusted resulting in the temperature behavior shown. As detailed below, in the scenario of FIG. 5 an increase in power initially takes place followed by a first power down operation at T2 and a second power down operation at T3. In particular, FIG. 5 displays a junction temperature curve 500 which represents the actual junction temperature of the device under control as a function of time. In some examples the junction temperature may be monitored by a platform temperature control component at regular intervals such as at millisecond intervals or other convenient interval. During an initial portion 502, the junction temperature is relatively lower and may be relatively constant. This initial portion 502 may correspond to base operating conditions of the device under control. For example, in the case where the device under control is a processor core, the base operating conditions may be defined by one or more states in which the core(s) are set to operate at a base operating frequency. Under these conditions, the processor core generates a heat load that results in a relatively low processor junction temperature represented by portion 502. This low processor junction temperature is not sufficient to generate a platform skin temperature that approaches or exceeds skin temperature limits set for a given platform. Accordingly, under base operating conditions in which the junction temperature is as represented in portion 502, the processor core may continue to operate indefinitely without intervention of a platform temperature control device.

As further depicted in FIG. 5, at the point T1, the junction temperature begins to rise rapidly. Continuing with the example of a processor core as the device under control, this point in time may correspond to the beginning of a so-called enhanced mode or turbo mode of operation in which processor core power is increased, for example, by increasing the core operating frequency. In conventional systems the turbo mode of operation permits a more responsive system that more rapidly handles the platform workload at hand and generates a better user experience. An excursion into an enhanced mode such as a turbo mode may last up to many seconds depending upon workload and other factors. After a certain period, the processor core may be scheduled to return to its base operating frequency, for example, when the workload that triggered turbo mode has been adequately addressed. In various embodiments, a power management (control) unit that controls junction temperature may also control the turbo mode operation.

If left unchecked, when a processor core enters turbo mode, depending upon the exact operating frequency of turbo mode, the number of other active components in a chip containing the turbo mode device, the system cooling, and other factors, the junction temperature of a device under control may rise more or less rapidly and may attain a relatively higher or lower junction temperature. In the example of FIG. 5, the junction temperature rises rapidly until the point T2. At the point T2 and beyond the junction temperature is maintained at the temperature 508 for the duration of the portion 512. The temperature 508 may represent a preset value for $T_{J\_MAX}$, which for which the actual value of $T_J$ should not exceed. During this portion 512, the operation of the processor core is throttled by the platform temperature control unit in order to maintain junction temperature at the maximum permissible value, that is, at or below the $T_{J\_MAX}$. Thus, during the portion 512, the turbo operation mode may be operated at a scaled back power that is greater than a power for base operation of the processor core, but is less than during the initial period 510 of turbo operation. In some examples the throttling may involve reducing operating frequency of the processor core, reducing micro-operations input rate, or other action to reduce power.

As further shown in FIG. 5, a calculated average junction temperature curve 504 may be generated as a function of time based upon the junction temperature curve 500. The calculated average junction temperature 504 may be determined based on different known averaging techniques in accordance with different embodiments. In one example an exponential rolling average (EWMA) is used to calculate average junction temperature. In the example of FIG. 5, during the interval 514 at any given point in time the calculated average junction temperature 504 is lower than corresponding junction temperature values and initially increases more gradually than junction temperature. This calculated average junction temperature 504 is used to compare against a temperature limit 506, which may represent a steady state temperature beyond which the processor core may not operate in order to avoid a breach of skin temperature limit for a platform that includes the processor core under control. As shown in FIG. 5 during the portion 512 between the points T2 and T3, the calculated average junction temperature 504 continues to increase gradually.

At the point T3 the value of the calculated average junction temperature 504 reaches or incrementally exceeds the value of the temperature limit 506. In order to maintain the average junction temperature at a value that does not exceed the steady state temperature for the processor core under control, at the point T3 the platform temperature control component further adjusts operation of the processor core. The adjustment may involve a controlled power down to a level that is consistent with maintaining average junction temperature 504 at or below the steady state junction temperature. Thus, during the interval 516, the junction temperature 500 decreases and asymptotically approaches and attains the average junction temperature at a level that does not exceed steady state junction temperature. During this interval 516, the processor core may continue to be operated at a power level higher than a base operating mode until, for example, a turbo mode of operation is terminated (not shown in FIG. 5).

The shape of the junction temperature curve 500 of FIG. 5 is thus characterized by a time interval 514 during which the device under control, such as a processor core, may be operated up to a maximum junction temperature. Only when the device has been operated at high power sufficiently long that the calculated average junction temperature exceeds a skin temperature limit is the device junction temperature scaled back below its maximum. The advantage of this approach is that it allows device operation for potentially extended periods of time at a high operating frequency, matching the maximum junction temperature before skin temperature limits (which are related to steady state junction temperature) are reached, thus executing more work and achieving a higher performance score. For example, in a portable tablet device, processor power excursion up to 4.5 W during turbo operation may generate heat that does not exceed device skin temperature limits for several tens of seconds. Thus, for example, consistent with the scenario of FIG. 5 the processor may be allowed to operate at a maximum junction temperature of 100° C. for some seconds without causing the skin temperature of a portable device housing the processor to exceed a skin temperature limit, such as 40° C.

Figure 6:
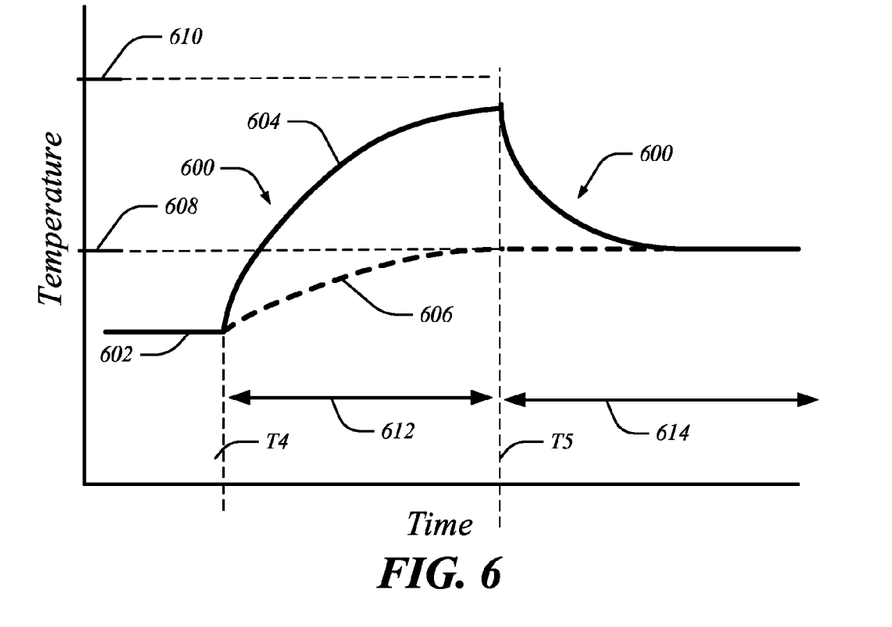
FIG. 6 illustrates another example of junction temperature behavior consistent with further embodiments.

FIG. 6 illustrates the control of temperature for a device under control in accordance with additional embodiments. In the scenario of FIG. 6, as in FIG. 5, the junction temperature of a device under control is monitored and the power to the device under control adjusted, resulting in the behavior shown. In particular, a junction temperature curve 600 shows the actual junction temperature of the device under control as a function of time. After an initial portion 600, where the junction temperature is relatively lower and may be relatively constant, at the point T4, the junction temperature begins to rise rapidly. Continuing with the example of a processor core temperature control, this point in time may correspond to the initiation of a so-called enhanced mode or turbo mode of operation. The rapid rise in temperature occurs during an interval 612 as represented by the portion 604.

In the example of FIG. 6, a calculated average junction temperature curve 606 is also generated as a function of time based upon the junction temperature curve 600. As with the example of FIG. 5, this calculated average junction temperature 606 is used to compare against a temperature limit 608, which may represent a steady state temperature beyond which the processor core may not operate in order not to cause a breach of skin temperature limit for a platform that includes the processor core under control. As shown in FIG. 6 during the portion 604 between the points T4 and T5, the calculated average junction temperature 606 continues to increase gradually.

At the point T5 the value of the calculated average junction temperature 606 reaches or exceeds the value of the temperature limit 608. In order to maintain the average junction temperature at a value that does not exceed the steady state temperature for the processor core under control, at the point T5 the platform temperature control component adjusts operation of the processor core to reduce power and thereby heat generated by the device under control. Thus, during the interval 614, the junction temperature 600 decreases and attains the same value as the average junction temperature at a level that does not exceed steady state junction temperature. During this interval 614, the processor core may continue to be operated at a power level higher than a base operating mode until, for example, a turbo mode of operation is terminated.

The shape of the junction temperature curve 600 of FIG. 6 is thus characterized by a time interval 612 during which the device under control, such as a processor core, may be operated up to a maximum turbo power. Notably in this example the junction temperature does not reach the temperature limit 610 which may represent a preset limit value of $T_{J\_MAX}$ for $T_J$ before the calculated average junction temperature 606 exceeds the steady state junction temperature limit which triggers a reduction in processor power. This particular behavior may occur in scenarios in which the particular power state invoked during turbo operation does not generate sufficient heat to (rapidly) reach the preset value for $T_{J\_MAX}$. In such cases the processor junction temperature $T_J$ may continue to rise or may reach a plateau. In either case, the operation of the processor core is reduced once T5 is reached.

It is to be noted that in the aforementioned embodiments the determination of an appropriate value of steady state temperature to limit a device under control may vary among different devices within a platform. For example, depending upon the position of a device, the size of the die upon which the device is located, and other factors, the same value of steady state temperature may result in a different skin temperature. Accordingly, a platform temperature control component may include multiple different steady state temperature limits to be applied to different devices under control.

Moreover, in further embodiments, a platform temperature control component may apply thermal control to multiple different devices within a platform simultaneously. In one example, a set of $T_{J\_MAX}$ and $T_{J\_STEADY\ STATE}$ limits may be stored and monitored for each of multiple different devices. Each separate device under control may thus be managed so that both $T_{J\_MAX}$ and $T_{J\_STEADY\ STATE}$ are not exceeded for that device.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 7:
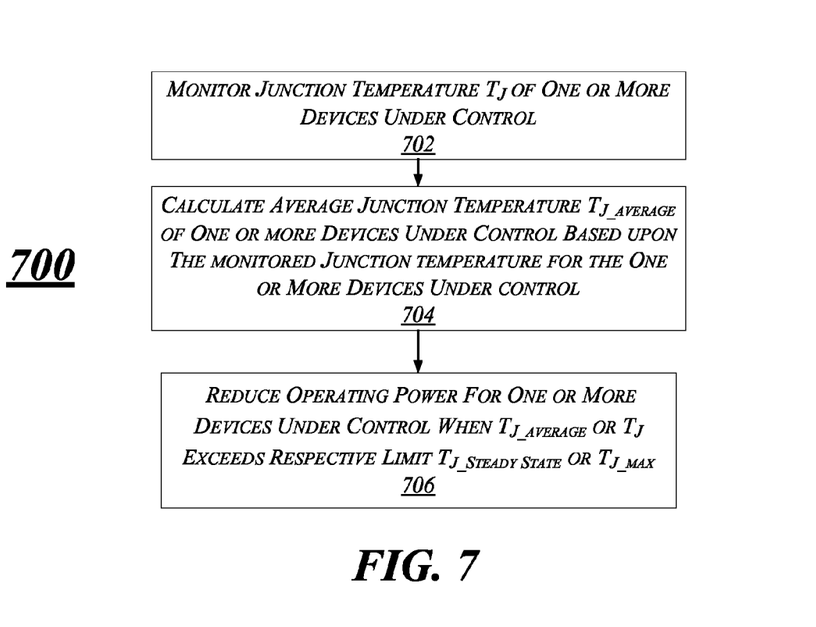
FIG. 7 presents an exemplary first logic flow.

FIG. 7 illustrates an exemplary first logic flow 700. In some implementations, the first logic flow 700 may be implemented in a power management unit for one or more devices under control for a common platform. At block 702, the junction temperature $T_J$ is monitored for one or more devices under control. Examples of devices under control include a CPU, GPU, memory device, radio communications chip, and chipset. At the block 704, the average junction temperature $T_{J\_average}$ is calculated based upon the monitored junction temperature for the one or more devices under control. The average junction temperature calculation may be based upon an exponential rolling average in one example. The flow then proceeds to block 706 where the operating power for one or more devices under control is reduced when $T_{J\_average}$ or $T_J$ exceeds a respective limit $T_{J\_STEADY\ STATE}$ or $T_{J\_MAX}$. In some embodiments the $T_{J\_STEADY\ STATE}$ represents that value of junction temperature consistent with long term operation that does not exceed a skin temperature limit for the platform that contains the one or more devices under control.

Figure 8:
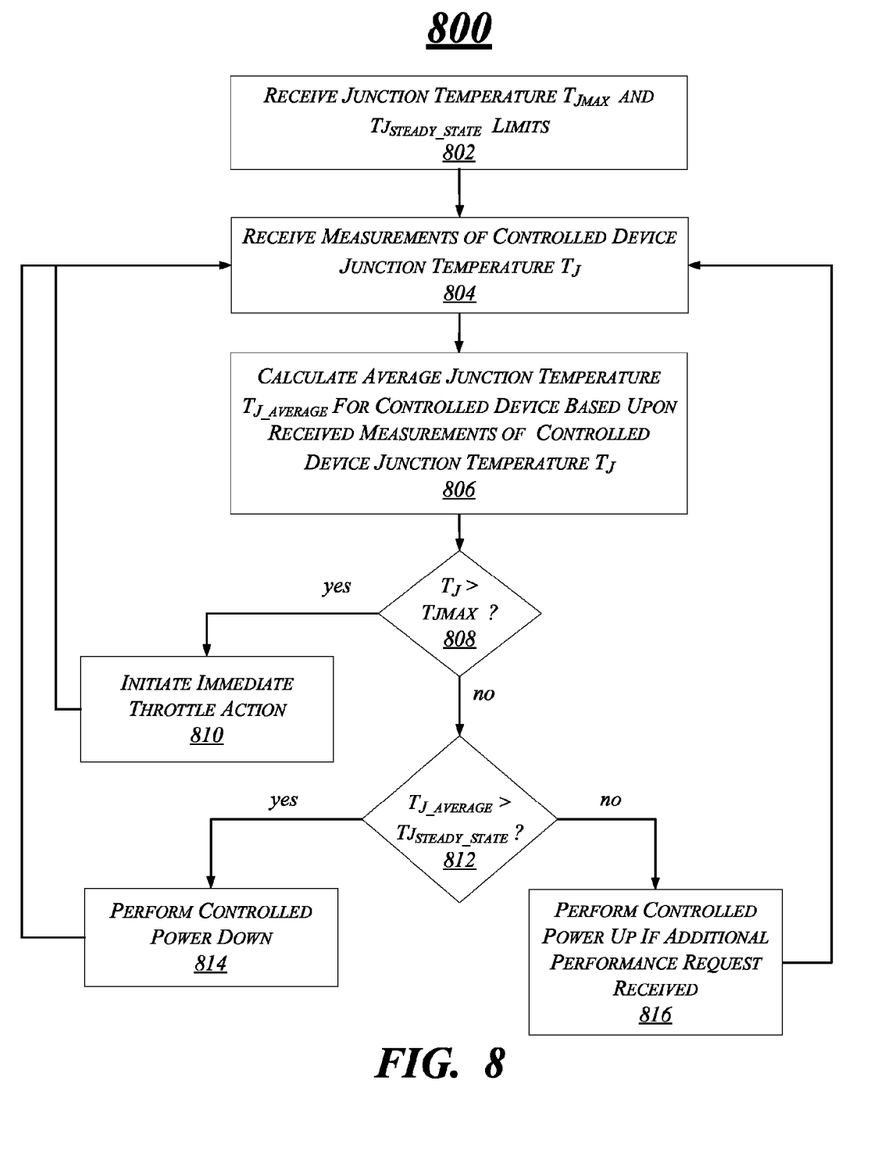
FIG. 8 presents an exemplary second logic flow.

FIG. 8 depicts an exemplary second logic flow 800. At block 802, a set of junction temperature limits Tj_max. and $Tj_{STEADY\_STATE}$ is received for a given controlled device. In some examples Tj_max. represents maximum specified operating temperature for a controlled device, while the $Tj_{STEADY\_STATE}$ represents the maximum junction temperature consistent with maintaining skin temperature of the platform that houses the controlled device at or below the skin temperature limit for that platform.

At block 804 measurements of the controlled device junction temperature $T_J$ are received. The measurements may be received at regular intervals such as every microsecond in one example. The flow then proceeds to block 806, where the average junction temperature $T_{J\_average}$ is calculated for the controlled device based upon the measurements of the controlled device junction temperature $T_J$.

The flow then proceeds to the decision block 808 where a determination is made as to whether $T_J > T_{J\_MAX}$. If so, the flow proceeds to the block 810 where an immediate throttling action is initiated which may involve immediately reducing the rate of micro-operations input to a controlled device, reducing the operating frequency of the controlled device, or other action. The flow then returns to block 804.

If, at block 808, the $T_J$ does not currently exceed $T_{J\_MAX}$, the flow proceeds to block 812. At the decision block 812 a determination is made as to whether the current calculated value of $T_{J\_average}$ exceeds $Tj_{STEADY\_STATE}$. If so, the flow proceeds to the block 814 where a controlled power down is performed for the controlled device. The flow then returns to block 804.

If at block decision block 812 a determination is made that the value of $T_{J\_average}$ does not exceed $Tj_{STEADY\_STATE}$, the flow proceeds to the block 816 where a controlled power up can performed for the controlled device, if additional performance request is made available, e.g. by an operating system requesting a high frequency. The flow then returns to block 804.

Figure 9:
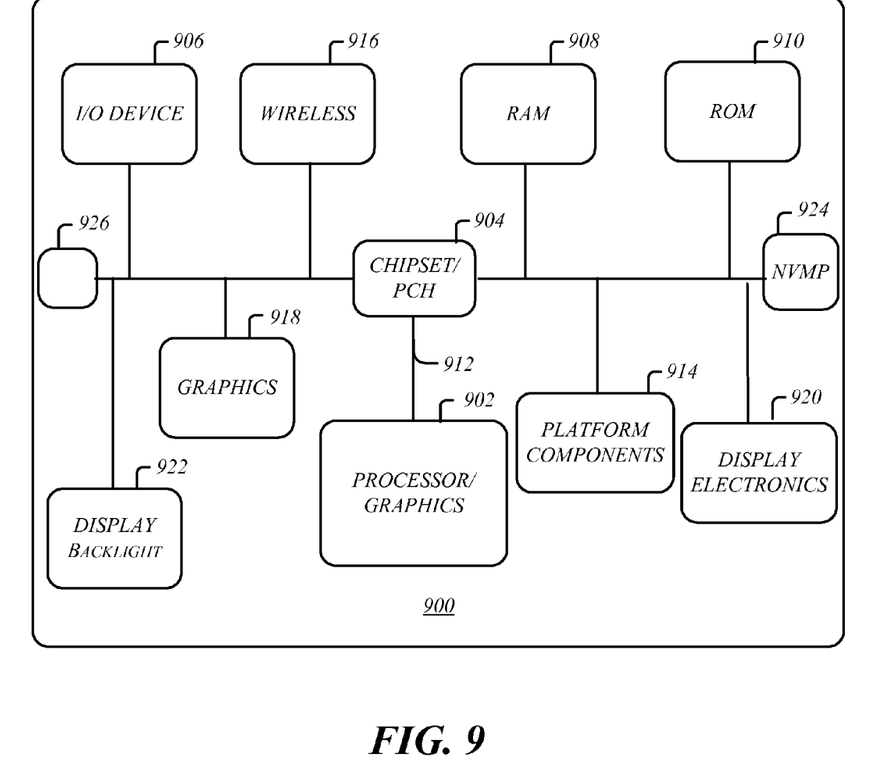
FIG. 9 is a diagram of an exemplary system embodiment.

FIG. 9 is a diagram of an exemplary system embodiment and in particular, FIG. 9 is a diagram showing a platform 900, which may include various elements. For instance, FIG. 9 shows that platform (system) 900 may include a processor/graphics core 902, a chipset/platform control hub (PCH) 904, an input/output (I/O) device 906, a random access memory (RAM) (such as dynamic RAM (DRAM)) 908, and a read only memory (ROM) 910, display electronics 920, display backlight 922, and various other platform components 914 (e.g., a fan, a crossflow blower, a heat sink, DTM system, cooling system, housing, vents, and so forth). System 900 may also include wireless communications chip 916 and graphics device 918. The embodiments, however, are not limited to these elements.

As shown in FIG. 9, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 902 may be multiple separate processors located on separate integrated circuit chips. In some embodiments processor 902 may be a processor having integrated graphics, while in other embodiments processor 902 may be a graphics core or cores.

The following examples pertain to further embodiments.

Example 1 is an apparatus that includes a temperature sensor to perform a multiplicity of junction temperature measurements for a component in a platform; and a controller comprising logic at least a portion of which is in hardware, the logic to receive from the temperature sensor the multiplicity of junction temperature measurements and to instruct the component to perform a first power down action of the component when a junction temperature measurement exceeds a first threshold, and to instruct the component to perform a second power down action of the component when an average junction temperature based on the multiplicity of junction temperature measurements exceeds a second threshold.

In example 2 the first threshold of example 1 optionally is a maximum junction temperature $T_{J\_MAX}$ for the component, and the logic optionally performs a rapid throttling of the component when the first threshold is exceeded, the rapid throttling comprising reducing micro-operations input rate and/or operating frequency for the component.

In example 3, the second threshold of any of the examples 1-2 optionally comprises a maximum steady state junction temperature $T_{J\_STEADY\ STATE}$, the logic to perform a controlled power down of the component when the second threshold is exceeded wherein skin temperature of the platform does not exceed about 40° C.

In example 4, the logic of any of the examples 1-3 may optionally determine the average junction temperature based upon a rolling average calculation for junction temperature measurements.

In example 5, the apparatus of any of the examples 1-4 optionally includes a second temperature sensor to perform a multiplicity of second junction temperature measurements for a second component of the platform; and the logic optionally receives from the second temperature sensor the multiplicity of second junction temperature measurements and to instruct the second component to perform a third power down action to the second circuit component when a second junction temperature measurement exceeds a third threshold and to instruct the second component to perform a fourth power down when an average junction temperature based on the multiplicity of second junction temperature measurements exceeds a fourth threshold.

In example 6 the component of any of the examples 1-5 optionally includes a general purpose processor (CPU), a graphics processor unit (GPU), a memory device, and/or a chipset.

In example 7, at least one computer-readable storage medium includes instructions that, when executed, cause a controller to: receive from a temperature sensor receive from a temperature sensor a multiplicity of junction temperature measurements; instruct a component to perform a first power down action of the component when a junction temperature measurement exceeds a first threshold; and instruct the component to perform a second power down action of the component when an average junction temperature based on the multiplicity of junction temperature measurements exceeds a second threshold.

In example 8, the at least one computer-readable storage medium of example 7 optionally includes instructions that, when executed, cause a controller to perform a rapid throttling of the component when a maximum junction temperature $T_{J\_MAX}$ is exceeded, the rapid throttling action comprising reducing micro-operations input rate and/or operating frequency for the component.

In example 9, the at least one computer-readable storage medium of any of examples 7-8 optionally includes instructions that, when executed, cause a controller to perform a controlled power down of the component when a maximum steady state junction temperature $T_{J\_STEADY\ STATE}$ is exceeded.

In example 10, the at least one computer-readable storage medium of any of examples 7-9 optionally includes instructions that, when executed, cause a controller to determine the average junction temperature based upon a rolling average calculation for junction temperature measurements.

In example 11, the at least one computer-readable storage medium of any of examples 7-10 optionally includes instructions that, when executed, cause a controller to: receive from a second temperature sensor a multiplicity of second junction temperature measurements for a second component; instruct the second component to perform a third power down action to the second circuit component when a second junction temperature measurement exceeds a third threshold; and instruct the second component to perform a fourth power down when an average junction temperature based on the multiplicity of second junction temperature measurements exceeds a fourth threshold.

Example 12 is an apparatus, comprising: a temperature sensor to perform a multiplicity of junction temperature measurements for a component in a platform; and a processor comprising logic at least a portion of which is in hardware, the logic to receive from the temperature sensor the multiplicity of junction temperature measurements and to instruct the component to perform a first power down action of the component when a junction temperature measurement exceeds a first threshold, and to instruct the component to perform a second power down action of the component when an average junction temperature based on the multiplicity of junction temperature measurements exceeds a second threshold.

In example 13 the first threshold of example 12 optionally comprises a maximum junction temperature $T_{J\_MAX}$ for the component, and the logic optionally performs a rapid throttling of the component when the first threshold is exceeded, the rapid throttling comprising reducing micro-operations input rate and/or operating frequency for the component.

In example 14, the second threshold of any of examples 12-13 optionally includes a maximum steady state junction temperature $T_{J\_STEADY\ STATE}$, and the logic optionally performs a controlled power down of the component when the second threshold is exceeded wherein skin temperature of the platform does not exceed about 40° C.

In example 15, the logic of any of examples 12-14 optionally determines the average junction temperature based upon a rolling average calculation for junction temperature measurements.

In example 16, the apparatus of any of examples 12-15 optionally includes a second temperature sensor to perform a multiplicity of second junction temperature measurements for a second component of the platform; and the logic optionally receives from the second temperature sensor the multiplicity of second junction temperature measurements and to instruct the second component to perform a third power down action to the second circuit component when a second junction temperature measurement exceeds a third threshold and to instruct the second component to perform a fourth power down when an average junction temperature based on the multiplicity of second junction temperature measurements exceeds a fourth threshold.

Example 17 at least one computer-readable storage medium includes instructions that, when executed, cause a processor to: receive from a temperature sensor a multiplicity of junction temperature measurements; instruct a component to perform a first power down action of the component when a junction temperature measurement exceeds a first threshold; and instruct the component to perform a second power down action of the component when an average junction temperature based on the multiplicity of junction temperature measurements exceeds a second threshold.

In example 18 the at least one computer-readable storage medium of example 17 optionally comprises instructions that, when executed, cause a controller to perform a rapid throttling of the component when a maximum junction temperature $T_{J\_MAX}$ is exceeded, the rapid throttling action comprising reducing micro-operations input rate and/or operating frequency for the component.

In example 19 the at least one computer-readable storage medium of any of examples 17-18 optionally includes instructions that, when executed, cause a controller to perform a controlled power down of the component when a maximum steady state junction temperature $T_{J\_STEADY\ STATE}$ is exceeded.

In example 20 the at least one computer-readable storage medium of any of examples 17-19 optionally includes instructions that, when executed, cause a controller to determine the average junction temperature based upon a rolling average calculation for junction temperature measurements.

In example 21 the at least one computer-readable storage medium of any of examples 17-20 optionally includes instructions that, when executed, cause a controller to: receive from a second temperature sensor a multiplicity of second junction temperature measurements for a second component; instruct the second component to perform a third power down action to the second circuit component when a second junction temperature measurement exceeds a third threshold; and instruct the second component to perform a fourth power down when an average junction temperature based on the multiplicity of second junction temperature measurements exceeds a fourth threshold.

Example 22 is a system comprising: a temperature sensor to perform a multiplicity of junction temperature measurements for a component in a platform; and control logic to receive from the temperature sensor the multiplicity of junction temperature measurements and to instruct the component to perform a first power down action of the component when a junction temperature measurement exceeds a first threshold, and to instruct the component to perform a second power down action of the component when an average junction temperature based on the multiplicity of junction temperature measurements exceeds a second threshold.

In example 23 the first threshold of example 22 optionally is a maximum junction temperature $T_{J\_MAX}$ for the component, the logic to perform a rapid throttling of the component when the first threshold is exceeded, the rapid throttling comprising reducing micro-operations input rate and/or operating frequency for the component.

In example 24 the second threshold of any of examples 22-23 optionally is a maximum steady state junction temperature $T_{J\_STEADY\_STATE}$, and the logic optionally performs a controlled power down of the component when the second threshold is exceeded.

In example 25 the control logic of any of examples 22-24 optionally determines the average junction temperature based upon a rolling average calculation for junction temperature measurements.

In example 26 the system of any of examples 22-25 optionally includes a second temperature sensor to perform a multiplicity of second junction temperature measurements for a second component of the platform; and the control logic optionally receives from the second temperature sensor the multiplicity of second junction temperature measurements and to instruct the second component to perform a third power down action to the second circuit component when a second junction temperature measurement exceeds a third threshold and to instruct the second component to perform a fourth power down when an average junction temperature based on the multiplicity of second junction temperature measurements exceeds a fourth threshold.

In example 27 the component of any of examples 22-26 optionally includes a general purpose processor (CPU), a graphics processor unit (GPU), a memory device, and/or a chipset.

In example 28, the system of any of the examples 22-27 optionally includes a processor that includes the control logic.

In example 29, the system of any of the examples 22-28 optionally includes a platform temperature control unit that includes the control logic.

In example 30, at least one computer-readable storage medium comprises instructions that, when executed, cause a system to: receive from a temperatures sensor a multiplicity of junction temperature measurements; instruct a component to perform a first power down action of the component when a junction temperature measurement exceeds a first threshold; and instruct the component to perform a second power down action of the component when an average junction temperature based on the multiplicity of junction temperature measurements exceeds a second threshold.

In example 31 the at least one computer-readable storage medium of example 30 optionally comprises instructions that, when executed, cause a system to perform a rapid throttling of the component when a maximum junction temperature $T_{J\_MAX}$ is exceeded, the rapid throttling action comprising reducing micro-operations input rate and/or operating frequency for the component.

In example 32 the at least one computer-readable storage medium of any of examples 30-31 optionally comprises instructions that, when executed, cause a system to perform a controlled power down of the component when a maximum steady state junction temperature $T_{J\_STEADY\_STATE}$ is exceeded.

In example 33 the at least one computer-readable storage medium of any of examples 30-32 optionally comprises instructions that, when executed, cause a system to determine the average junction temperature based upon a rolling average calculation for junction temperature measurements.

In example 34 the at least one computer-readable storage medium of any of examples 30-33 optionally includes instructions that, when executed, cause a system to receive from a second temperature sensor a multiplicity of second junction temperature measurements for a second component; instruct the second component to perform a third power down action to the second circuit component when a second junction temperature measurement exceeds a third threshold; and instruct the second component to perform a fourth power down when an average junction temperature based on the multiplicity of second junction temperature measurements exceeds a fourth threshold.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
    a temperature sensor to perform a multiplicity of junction temperature measurements for a component in a platform; and
    a controller comprising logic at least a portion of which is in hardware, the logic to:
        receive from the temperature sensor the multiplicity of junction temperature measurements;
        determine whether a one of the multiplicity of junction temperature measurements exceeds a first threshold;
        determine whether an average junction temperature based on the multiplicity of junction temperature measurements exceeds a second threshold; and
        instruct the component to perform a first power down action of the component based on a determination that a one of the multiplicity of junction temperature measurements exceeds the first threshold; or
        instruct the component to perform a second power down action of the component based on a determination that an average junction temperature based the multiplicity of junction temperature measurements exceeds the second threshold.

2. The apparatus of claim 1, the first threshold comprising a maximum junction temperature $T_{J\_MAX}$ for the component, the logic to perform a rapid throttling of the component when the first threshold is exceeded, the rapid throttling comprising reducing micro-operations input rate and/or operating frequency for the component.

3. The apparatus of claim 1, the second threshold comprising a maximum steady state junction temperature $T_{J\_STEADY\_STATE}$, the logic to perform a controlled power down of the component when the second threshold is exceeded, wherein skin temperature of the platform does not exceed about 40° C.

4. The apparatus of claim 1 the logic to determine the average junction temperature based upon a rolling average calculation for junction temperature measurements.

5. The apparatus of claim 1, comprising:
    a second temperature sensor to perform a multiplicity of second junction temperature measurements for a second component of the platform; and
    the logic to receive from the second temperature sensor the multiplicity of second junction temperature measurements and to instruct the second component to perform a third power down action to the second circuit component when a one of the multiplicity of second junction temperature measurements exceeds a third threshold and to instruct the second component to perform a fourth power down action when a second average junction temperature based on the multiplicity of second junction temperature measurements exceeds a fourth threshold.

6. The apparatus of claim 1, the component comprising a general purpose processor (CPU), a graphics processor unit (GPU), a memory device, and/or a chipset.

7. At least one non-transitory computer-readable storage medium comprising instructions that, when executed, cause a controller to:
receive from a temperature sensor a multiplicity of junction temperature measurements;
determine whether a one of the multiplicity of junction temperature measurements exceeds a first threshold;
determine whether an average junction temperature based on the multiplicity of junction temperature measurements exceeds a second threshold; and
instruct a component to perform a first power down action of the component based on a determination that a one of the multiplicity of junction temperature measurements exceeds the first threshold; or
instruct the component to perform a second power down action of the component based on a determination that an average junction temperature based on the multiplicity of junction temperature measurements exceeds the second threshold.

8. The at least one computer-readable storage medium of claim 7 comprising instructions that, when executed, cause a controller to perform a rapid throttling of the component when a maximum junction temperature $T_{J\_MAX}$ is exceeded, the rapid throttling action comprising reducing micro-operations input rate and/or operating frequency for the component.

9. The at least one computer-readable storage medium of claim 7 comprising instructions that, when executed, cause a controller to perform a controlled power down of the component when a maximum steady state junction temperature $T_{J\_STEADY\,STATE}$ is exceeded.

10. The at least one computer-readable storage medium of claim 7 comprising instructions that, when executed, cause a controller to determine the average junction temperature based upon a rolling average calculation for junction temperature measurements.

11. The at least one computer-readable storage medium of claim 7 comprising instructions that, when executed, cause a controller to:
receive from a second temperature sensor a multiplicity of second junction temperature measurements for a second component;
instruct the second component to perform a third power down action to the second circuit component when a one of the multiplicity of second junction temperature measurements exceeds a third threshold; and
instruct the second component to perform a fourth power down when a second average junction temperature based on the multiplicity of second junction temperature measurements exceeds a fourth threshold.

12. An apparatus, comprising:
a temperature sensor to perform a multiplicity of junction temperature measurements for a component in a platform; and
a processor comprising logic at least a portion of which is in hardware, the logic to:
receive from the temperature sensor the multiplicity of junction temperature measurements;
determine whether a one of the multiplicity of junction temperature measurements exceeds a first threshold;
determine whether an average junction temperature based on the multiplicity of junction temperature measurements exceeds a second threshold; and
instruct the component to perform a first power down action of the component based on a determination that a one of the multiplicity of junction temperature measurements exceeds the first threshold; or
instruct the component to perform a second power down action of the component based on a determination that an average junction temperature based the multiplicity of junction temperature measurements exceeds the second threshold.

13. The apparatus of claim 12, the first threshold comprising a maximum junction temperature $T_{J\_MAX}$ for the component, the logic to perform a rapid throttling of the component when the first threshold is exceeded, the rapid throttling comprising reducing micro-operations input rate and/or operating frequency for the component.

14. The apparatus of claim 12, the second threshold comprising a maximum steady state junction temperature $T_{J\_STEADY\,STATE}$, the logic to perform a controlled power down of the component when the second threshold is exceeded, wherein skin temperature of the platform does not exceed about 40° C.

15. The apparatus of claim 12 the logic to determine the average junction temperature based upon a rolling average calculation for junction temperature measurements.

16. The apparatus of claim 12, comprising:
a second temperature sensor to perform a multiplicity of second junction temperature measurements for a second component of the platform; and
the logic to receive from the second temperature sensor the multiplicity of second junction temperature measurements and to instruct the second component to perform a third power down action to the second circuit component when a one of the multiplicity of second junction temperature measurements exceeds a third threshold and to instruct the second component to perform a fourth power down when a second average junction temperature based on the multiplicity of second junction temperature measurements exceeds a fourth threshold.

17. At least one non-transitory computer-readable storage medium comprising instructions that, when executed, cause a processor to:
receive from a temperature sensor a multiplicity of junction temperature measurements;
determine whether a one of the multiplicity of junction temperature measurements exceeds a first threshold;
determine whether an average junction temperature based on the multiplicity of junction temperature measurements exceeds a second threshold; and
instruct a component to perform a first power down action of the component based on a determination that a one of the multiplicity of junction temperature measurement exceeds the first threshold; or
instruct the component to perform a second power down action of the component based on a determination that an average junction temperature based on the multiplicity of junction temperature measurements exceeds the second threshold.

18. The at least one computer-readable storage medium of claim 17 comprising instructions that, when executed, cause a controller to perform a rapid throttling of the component when a maximum junction temperature $T_{J\_MAX}$ is exceeded, the rapid throttling action comprising reducing micro-operations input rate and/or operating frequency for the component.

19. The at least one computer-readable storage medium of claim 17 comprising instructions that, when executed, cause a controller to perform a controlled power down of the component when a maximum steady state junction temperature $T_{J\_STEADY\,STATE}$ is exceeded.

20. The at least one computer-readable storage medium of claim 17 comprising instructions that, when executed, cause a controller to determine the average junction temperature based upon a rolling average calculation for junction temperature measurements.

21. The at least one computer-readable storage medium of claim 17 comprising instructions that, when executed, cause a controller to:
receive from a second temperature sensor a multiplicity of second junction temperature measurements for a second component;
instruct the second component to perform a third power down action to the second circuit component when a one of the multiplicity of second junction temperature measurement exceeds a third threshold; and
instruct the second component to perform a fourth power down when a second average junction temperature based on the multiplicity of second junction temperature measurements exceeds a fourth threshold.

22. A system, comprising:
a temperature sensor to perform a multiplicity of junction temperature measurements for a component in a platform; and
control logic to:
receive from the temperature sensor the multiplicity of junction temperature measurements;
determine whether a one of the multiplicity of junction temperature measurements exceeds a first threshold;
determine whether an average junction temperature based on the multiplicity of junction temperature measurements exceeds a second threshold; and
instruct the component to perform a first power down action of the component based on a determination that a one of the multiplicity of junction temperature measurements exceeds the first threshold; or
instruct the component to perform a second power down action of the component based on a determination that an average junction temperature based the multiplicity of junction temperature measurements exceeds the second threshold.

23. The system of claim 22, the first threshold comprising a maximum junction temperature $T_{J\_MAX}$ for the component, the logic to perform a rapid throttling of the component when the first threshold is exceeded, the rapid throttling comprising reducing micro-operations input rate and/or operating frequency for the component.

24. The system of claim 22, the second threshold comprising a maximum steady state junction temperature $T_{J\_STEADY\_STATE}$, the logic to perform a controlled power down of the component when the second threshold is exceeded.

25. The system of claim 22, the control logic to determine the average junction temperature based upon a rolling average calculation for junction temperature measurements.

26. The system of claim 22, comprising a processor that includes the control logic.

27. The system of claim 22, comprising a platform temperature control unit that includes the control logic.

* * * * *